Patented July 2, 1940

2,206,099

UNITED STATES PATENT OFFICE 2,206,099

AZO COMPOUNDS AND FIBER DYED THEREWITH

James G. McNally and Joseph B. Dickey, Rochester, N. Y., assignors to Eastman Kodak Company, Rochester, N. Y., a corporation of New Jersey No Drawing. Application February 23, 1939,
Serial No. 258,020

11 Claims. (Cl. 260—205)

This invention relates to the art of dyeing or coloring. More particularly it relates to azo dye compounds and the application of the nuclear non-sulfonated azo dye compounds for the coloration of organic derivatives of cellulose, particularly textile materials made of or containing an organic derivative of cellulose, by dyeing, printing, stenciling or like methods.

Organic derivatives of cellulose are characterized by an indifferent affinity for the usual cotton and wool dyes especially the ordinary water soluble dyes. Because of this, it has been necessary to develop new dye compounds suitable for the dyeing or coloration of materials, such as textile materials, made of or containing an organic derivative of cellulose. It is, accordingly, an object of our invention to provide a new class of azo dyes suitable for the dyeing or coloration of organic derivatives of cellulose. Another object is to provide a process for the coloration of organic derivatives of cellulose in which the dye or dyes are applied directly from an aqueous suspension to the material undergoing coloration. A further object is to produce dyeings on organic derivatives of cellulose which are of good fastness to light and washing. Other objects will hereinafter appear.

Typical organic derivatives of cellulose include the hydrolyzed as well as the unhydrolyzed cellulose organic acid esters such as cellulose acetate, cellulose formate, cellulose propionate, or cellulose butyrate and the hydrolyzed as well as the unhydrolyzed mixed organic acid esters of cellulose such as cellulose acetate-propionate, cellulose acetate-butyrate, and the cellulose ethers such as methyl cellulose, ethyl cellulose, or benzyl cellulose. While our invention will be illustrated more particularly in connection with the coloration of cellulose acetate, a material to which the invention is especially adapted, it will be understood that it applies to the coloration of other organic derivatives of cellulose such as those just mentioned.

The azo dye compounds of our invention have the general formula:

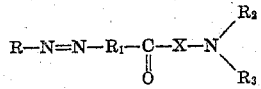

wherein R represents the residue of an aryl coupling component of the benzene or naphthalene series, a hydroaromatic coupling component or a heterocyclic coupling component, $R_1$ represents a phenylene nucleus, X represents a saturated hydrocarbon radicle not containing more than 4 carbon atoms, $R_2$ and $R_3$ each represents an alkyl group and wherein the

grouping is in ortho or para position to the azo bond. The phenylene nucleus, $R_1$, may be unsubstituted or substituted. It may be substituted, for example, with an alkyl group, an alkoxy group, a nitro group or a halogen atom. Ordinarily X will be a saturated straight chain hydrocarbon radicle not containing more than 4 carbon atoms.

It will be understood that alkyl, as used herein, unless otherwise stated, includes not only unsubstituted alkyl groups such as a methyl group, an ethyl group or a propyl group but also substituted alkyl groups such as β-hydroxyethyl, β-hydroxypropyl, β,γ-hydroxypropyl, β-methoxyethyl or β-ethoxyethyl, for example. Similarly, alkoxy, as used herein, includes groups such as a methoxy group, an ethoxy group, a propoxy group, β-methoxyethoxy and β-ethoxyethoxy, for example. Illustrative of halogen may be mentioned bromine, chlorine and iodine.

The azo dye compounds of our invention can be prepared by diazotizing a primary aromatic amine having the general formula:

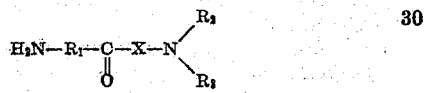

wherein $R_1$, $R_2$, $R_3$ and X have the meaning previously assigned to them and coupling the diazonium compound obtained with an aryl, hydroaromatic or heterocyclic coupling component.

As previously indicated, the nuclear non-sulfonated azo dye compounds of our invention constitute valuable dyes for the coloration of organic derivatives of cellulose, such as those hereinbefore mentioned, yielding various shades thereon of good fastness to light and washing. These nuclear non-sulfonated dye compounds likewise possess application for the dyeing of wool and silk and yield generally similar shades on these materials as on organic derivatives of cellulose.

Azo compounds having the above general formula containing a nuclear sulfonic acid group can likewise be prepared in known fashion. Such compounds may be prepared by sulfonation of the unsulfonated azo dye compound or by prior sulfonation of the intermediates employed. These nuclear sulfonated compounds possess little or no utility for the coloration of organic derivatives of cellulose but can be employed to color textile materials such as wool and silk yielding generally similar shades as the corresponding non-sulfonated compounds. Accordingly, when the azo compounds of our invention are to be employed for the dyeing of organic derivatives of cellulose, they should not contain a nuclear sulfonic acid group. Again it is generally advantageous, when they are to be used for this purpose, that they do not contain a carboxylic acid group.

The following examples illustrate the preparation of the azo dye compounds of our invention:

*Example 1*

0.1 gram mole of p-amino-ω-dimethylaminoacetophenone is dissolved in 200 cc. of water containing 35 cc. of 36% hydrochloric acid. The resulting solution is cooled to a temperature approximating 0–5° C. and diazotized while maintaining this temperature by the addition, with stirring, of a concentrated aqueous solution of 6.9 grams of sodium nitrite.

12.5 grams of 5-methyl-1,3-cyclohexadione are dissolved in 200 cc. of water containing 31.8 grams of sodium carbonate. The resulting solution is cooled to a temperature approximating 0–10° C. by the addition of ice, for example, and the diazo solution prepared as described above is added with stirring. The coupling reaction which takes place is carried out while maintaining a temperature of about 0–10° C. Upon completion of the coupling reaction, the mixture is made slightly acid to litmus by the addition of acetic or hydrochloric acid, for example, and the dye compound is recovered by filtration, washed with water and dried. The dye compound obtained has the formula:

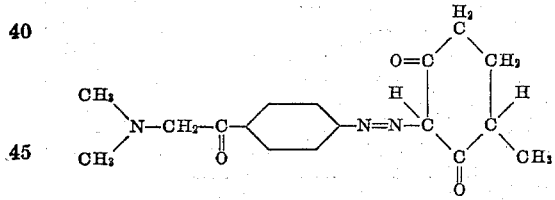

and colors cellulose acetate silk a greenish yellow shade of excellent light fastness from an aqueous suspension.

20.4 grams of p-amino-ω-diethylaminoacetophenone may be substituted for the p-amino-ω-dimethylaminoacetophenone of the example to obtain a dye compound which similarly colors cellulose acetate silk a greenish yellow shade of good light fastness.

*Example 2*

12.8 grams of barbituric acid are dissolved in 200 cc. of water containing 31 grams of sodium carbonate. The resulting solution is cooled to a temperature approximating 0–10° C. and coupled while maintaining this temperature with the diazo solution prepared in Example 1. The dye compound formed by the coupling reaction is precipitated by making the mixture slightly acid to litmus with acetic acid following which it is recovered by filtration, washed with water and dried. The dye compound obtained has the formula:

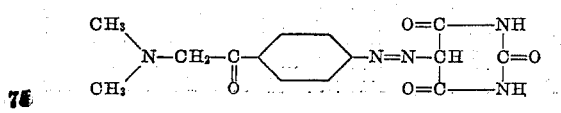

and colors cellulose acetate silk a greenish yellow shade of good light fastness from an aqueous suspension.

The diazo compound resulting from the diazotization of 20.4 grams of p-amino-ω-diethylaminoacetophenone may be substituted for the diazo component of the example to obtain a dye which similarly colors cellulose acetate silk a greenish yellow shade of good light fastness.

*Example 3*

22.3 grams of 2-amino-5-nitro-ω-dimethylaminoacetophenone are diazotized in nitrosyl sulfuric acid in known manner and the diazonium compound obtained is added to an iced hydrochloric acid solution of glyceryl cresidine. The coupling reaction which takes place is completed in known manner and the dye compound formed is worked up in the usual fashion. The dye compound obtained has the formula:

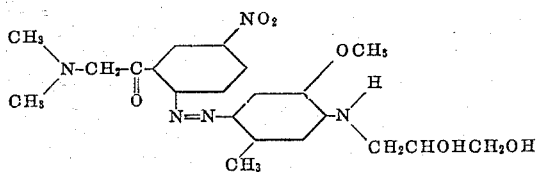

and colors cellulose acetate silk violet shades from an aqueous suspension.

.1 gram mole of 2-amino-5-methyl-ω-diethylaminoacetophenone can be substituted for the 2-amino-5-nitro-ω-dimethylaminoacetophenone of the example to obtain a dye compound which colors cellulose acetate silk a violet shade.

*Example 4*

17.5 grams of ethyl-β-hydroxyethylaniline are dissolved in 100 cc. of glacial acetic acid and the resulting solution is cooled by the addition of ice, for example, to a temperature approximating 0–10° C. To the solution thus prepared, the diazo solution prepared as described in Example 1 is slowly added with stirring and following its addition the mixture is made neutral to Congo red paper with sodium acetate. Upon completion of the coupling reaction which takes place, the dye compound formed is precipitated by the addition of water, recovered by filtration, washed with water and dried. The dye compound obtained colors cellulose acetate silk an orange shade of good light fastness.

.1 gram mole of

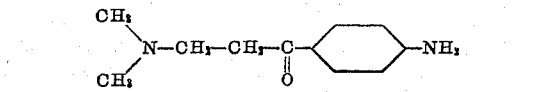

or .1 gram mole of

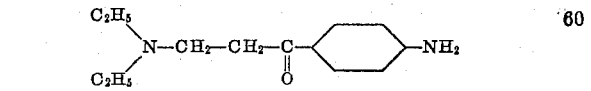

can be diazotized and coupled with the ethyl-β-hydroxyethylaniline of the example to obtain dye compounds which similarly color cellulose acetate silk orange shades of good light fastness.

The following tabulation further illustrates the compounds included within the scope of our invention together with the color they produce on cellulose acetate silk. The compounds indicated below may be prepared by diazotizing the amines listed under the heading "Amine" and coupling the diazonium compounds obtained with the compound specified in the column entitled "Coupling component." The diazotization and coupling reactions may, for example, be carried out following the general procedure described in Examples 1 to 4 inclusive.

into an autoclave and heated at 180-200° C. for twenty-four hours. When cool, the reaction mixture is extracted with ether and the 4-aminophenyl-ω-di-β-hydroxyethylaminomethyl ketone

| Amine | Coupling component | Color on cellulose acetate silk |
|---|---|---|
| p-Amino-ω-dimethylaminoacetophenone | Ethyl-β-hydroxyethylaniline | Orange. |
| Do | Ethylglycerylaniline | Do. |
| Do | Butyl-β-hydroxyethylaniline | Do. |
| Do | Di-β-hydroxyethylaniline | Do. |
| Do | Propyl-β-hydroxyethylaniline | Do. |
| Do | β-hydroxyethylaniline | Orange-yellow. |
| Do | Glycerylaniline | Do. |
| Do | Dimethyl-α-naphthylamine | Red. |
| Do | β-hydroxyethyl-α-naphthylamine | Do. |
| Do | 1-phenyl-3-methyl-5-pyrazolone | Greenish-yellow. |
| p-Amino-ω-diethylaminoacetophenone | Ethyl-β-hydroxyethylaniline | Orange. |
| Do | Di-β-hydroxyethyl-α-naphthylamine | Red. |
| Do | 1,3-cyclohexadione | Greenish-yellow. |
| Do | 2-imino-6-methyl uracil | Do. |
| Do | 6-iminobarbituric acid | Do. |
| Do | Thiobarbituric acid | Greenish-orange-yellow. |
| p-Amino-ω-di-β-hydroxyethylaminoacetophenone | Propyl-β-hydroxyethyl-aniline | Orange. |
| Do | Dimethylaniline | Orange-yellow. |
| Do | m-Toluidine | Do. |
| Do | 1-ethylbarbituric acid | Greenish-yellow. |
| Do | Malonylmalonamide | Do. |
| Do | 5-phenyl-1,3-cyclohexadione | Do. |
| 2-amino-5-methoxy-ω-dimethylaminoacetophenone | Di-β-hydroxyethylaniline | Orange. |
| 2-amino-5-chloro-ω-dimethylaminoacetophenone | Ethyl-β-hydroxyethylaniline | Orange-yellow. |
| Do | 2-imino-3-cyanobarbituric acid | Greenish-yellow. |
| Do | 1-butyl-3-hydroxy-7-methyltetrahydroquinoline | Orange. |
| 4-amino-3-methoxy-5-nitro-ω-diethylaminoacetophenone | Di-β-hydroxyethylaniline | Red. |
| Do | β-hydroxyethylaniline | Orange. |
| Do | 5,5-dimethyl-1,3-cyclohexadione | Greenish-yellow. |
| 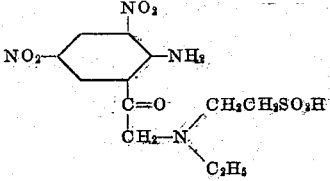 | Di-β-hydroxyethylaniline | Violet. |
| Do | 5-methyl-1,3-cyclohexadione | Greenish-yellow. |
|  | Glycerylaniline | Orange. |
| Do | 2,6-dimethylaminopyridine | Greenish-yellow. |
| Do | 1-benzylbarbituric acid | Do. |
| 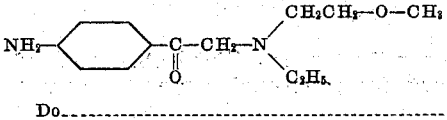 | Di-β-hydroxyethylaniline | Orange. |
| Do | 6-methyliminobarbituric acid | Greenish-yellow. |
| Do | 4,6-diiminobarbituric acid | Do. |
| 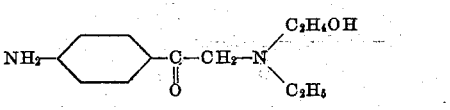 | 5,5-dimethyl-1,3-cyclohexadione | Do. |
| Do | Di-β-hydroxyethylaniline | Orange. |
| Do | Propyl-β-hydroxyethylaniline | Do. |
| 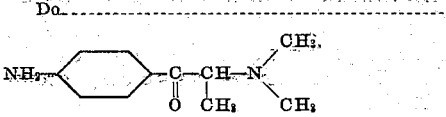 | Barbituric acid | Greenish-yellow. |
| Do | Ethyl-β-hydroxyethylaniline | Orange. |
| Do | Ethyl glycerylaniline | Do. |

In order that the preparation of the azo dye compounds of our invention may be clearly understood, the preparation of the amine compounds employed in their preparation is indicated hereinafter.

*Preparation of 4-aminophenyl-ω-di-β-hydroxyethylamino-methyl ketone*

100 grams of 4-chlorophenyl-ω-di-β-hydroxyethylaminomethyl ketone, one liter of ammonia water (sp. gr. 0.9), one gram of finely divided copper and one gram of cuprous oxide are charged desired is recovered from the ether extract by distilling off the ether in known fashion. The yield obtained approximates 90%.

By the substitution of 4-chlorophenyl-ω-dimethylaminoacetophenone for the 4-chlorophenyl-ω-di-β-hydroxyethylaminomethyl ketone of the example 4-aminophenyl-ω-dimethylaminoacetophenone may be obtained. Similarly by the use of 4-chlorophenyl-ω-diethylaminoacetophenone, 4-aminophenyl-ω-diethylaminoacetophenone may be obtained.

Compounds having the formula:

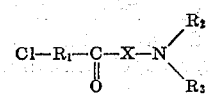

wherein $R_1$, $R_2$, $R_3$ and X have the meaning previously assigned to them from which the amines used in the preparation of the azo dye compounds of our invention can be prepared, as indicated above, may be prepared as described in the literature.

The azo dye compounds of our invention are, for the most part, relatively insoluble in water. Those compounds which are insoluble in water may be advantageously employed for the direct dyeing of textile materials by grinding the dye to a fine powder, intimately mixing it with a suitable dispersing or solubilizing agent, and adding the resulting mixture to water or a dilute solution of soap in water to form an aqueous dyebath. Following this known preparation of the dyebath, the textile materials to be dyed may be added to the dyebath and the dyeing operation conducted in known fashion. The dye compounds of our invention which are water soluble do not, of course, require the use of a dispersing or solubilizing agent but may be applied to silk, wool and (depending upon the nature and position of the water-solubilizing group) organic derivatives of cellulose textile materials from an aqueous solution of the dye which may contain salt. For a more complete description as to how the azo dye compounds of our invention may be employed in dyeing or coloring operations, reference may be had to our U. S. Letters Patent No. 2,115,030, issued April 26, 1938. For a more detailed description as to how the water soluble azo dyes of our invention may be employed for the coloration of textile materials made of or containing organic derivatives of cellulose, silk and wool or mixtures of these, reference may be had to our U. S. Letters Patent No. 2,107,898, issued February 8, 1938.

We claim:

1. An azo dye compound having the general formula:

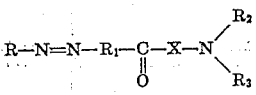

wherein R represents the residue of a coupling component selected from the group consisting of a benzene, a naphthalene, a hydroaromatic and a heterocyclic coupling component, $R_1$ represents a phenylene nucleus, X represents a saturated hydrocarbon radical not containing more than four carbon atoms, $R_2$ and $R_3$ each represents an alkyl group and wherein the

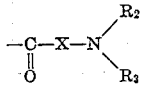

grouping is in ortho or para position to the azo bond.

2. An azo dye compound having the general formula:

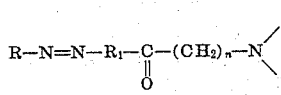

wherein R represents the residue of a coupling component selected from the group consisting of a benzene, a naphthalene, a hydroaromatic and a heterocyclic coupling component, $R_1$ represents a phenylene nucleus, $R_2$ and $R_3$ each represents an alkyl group, $n$ represents 1, 2, 3 or 4 and wherein the

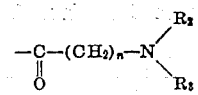

grouping is in ortho or para position to the azo bond.

3. An azo dye compound having the general formula:

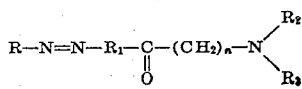

wherein R represents the residue of a benzene coupling component, $R_1$ represents a phenylene nucleus, $R_2$ and $R_3$ each represents an alkyl group, $n$ represents 1, 2, 3 or 4 and wherein the

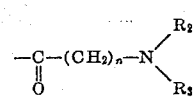

grouping is in the para position to the azo bond.

4. An azo dye compound having the general formula:

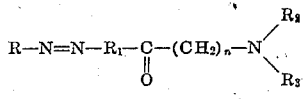

wherein R represents the residue of a benzene coupling component, $R_1$ represents a phenylene nucleus, $R_2$ and $R_3$ each represents an alkyl group, $n$ represents 1, 2, 3 or 4 and wherein the

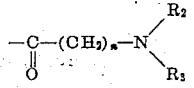

grouping is in the ortho position to the azo bond.

5. An azo dye compound having the general formula:

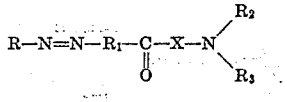

wherein R represents the residue of a benzene coupling component, $R_1$ represents a phenylene nucleus, X represents a saturated hydrocarbon radical not containing more than four carbon atoms, $R_2$ and $R_3$ each represents an alkyl group and wherein the

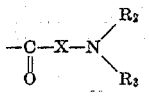

grouping is in ortho or para position to the azo bond.

6. Material made of or containing an organic derivative of cellulose and in which said organic derivative of cellulose is colored with a nuclear non-sulfonated azo dye compound having the general formula:

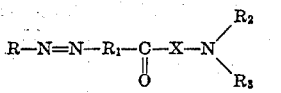

wherein R represents the residue of a coupling component selected from the group consisting of a benzene, a naphthalene, a hydroaromatic and a heterocyclic coupling component, $R_1$ represents a phenylene nucleus, X represents a saturated hydrocarbon radical not containing more than four carbon atoms, $R_2$ and $R_3$ each represents an alkyl group and wherein the

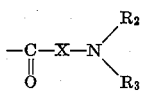

grouping is in ortho or para position to the azo bond.

7. Material made of or containing an organic derivative of cellulose and in which said organic derivative of cellulose is colored with a nuclear non-sulfonated azo dye compound having the general formula:

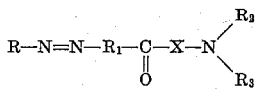

wherein R represents the residue of a benzene coupling component, $R_1$ represents a phenylene nucleus, X represents a saturated hydrocarbon radical not containing more than four carbon atoms, $R_2$ and $R_3$ each represents an alkyl group and wherein the

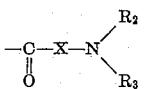

grouping is in ortho or para position to the azo bond.

8. A cellulose acetate colored with a nuclear non-sulfonated azo dye compound having the general formula:

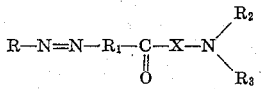

wherein R represents the residue of a coupling component selected from the group consisting of a benzene, a naphthalene, a hydroaromatic and a heterocyclic coupling component, $R_1$ represents a phenylene nucleus, X represents a saturated hydrocarbon radical not containing more than four carbon atoms, $R_2$ and $R_3$ each represents an alkyl group and wherein the

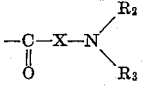

grouping is in ortho or para position to the azo bond.

9. A cellulose acetate colored with a nuclear non-sulfonated azo dye compound having the general formula:

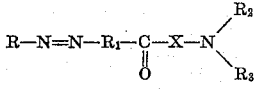

wherein R represents the residue of a benzene coupling component, $R_1$ represents a phenylene nucleus, X represents a saturated hydrocarbon radical not containing more than four carbon atoms, $R_2$ and $R_3$ each represents an alkyl group and wherein the

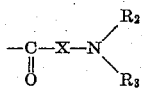

grouping is in ortho or para position to the azo bond.

10. A cellulose acetate colored with a nuclear non-sulfonated azo dye compound having the general formula:

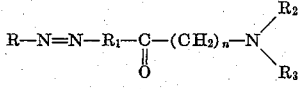

wherein R represents the residue of a benzene coupling component, $R_1$ represents a phenylene nucleus, $R_2$ and $R_3$ each represents an alkyl group, $n$ represents 1, 2, 3 or 4 and wherein the

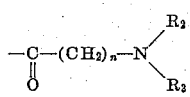

grouping is in the para position to the azo bond.

11. A cellulose acetate colored with a nuclear non-sulfonated azo dye compound having the general formula:

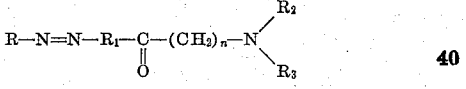

wherein R represents the residue of a benzene coupling component, $R_1$ represents a phenylene nucleus, $R_2$ and $R_3$ each represents an alkyl group, $n$ represents 1, 2, 3 or 4 and wherein the

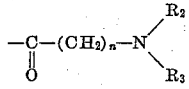

grouping is in the ortho position to the azo bond.

JAMES G. McNALLY.
JOSEPH B. DICKEY.